Figure 1:
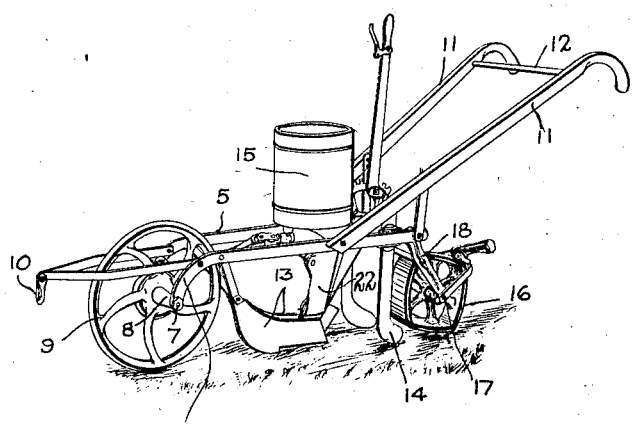

R. ALLEN.
PLANTER.
APPLICATION FILED JAN. 10, 1911.

1,030,759.

Patented June 25, 1912.

WITNESSES

INVENTOR
Ralph Allen
BY
ATTORNEYS

UNITED STATES PATENT OFFICE.

RALPH ALLEN, OF WELTY PRECINCT, OKFUSKEE COUNTY, OKLAHOMA.

PLANTER.

1,030,759.  Specification of Letters Patent.  Patented June 25, 1912.

Application filed January 10, 1911. Serial No. 601,790.

*To all whom it may concern:*

Be it known that I, RALPH ALLEN, a citizen of the United States, and a resident of Welty precinct, in the county of Okfuskee and State of Oklahoma, have invented a new and Improved Planter, of which the following is a full, clear, and exact description.

My invention relates to planters and it has for its object to provide one which will plant the seed at varying depths and thereby secure a better stand.

My planter is particularly serviceable in planting cotton seed which is usually planted ten or twenty times as thick as necessary, to obtain the desired stand. If, after the planting, the weather is moist and warm, the seed will germinate when planted near the surface, but if the weather, after the planting, is dry, the result will be very poor, unless the seed is planted an inch deep. As with my planter some of the seed is planted near the surface, while other seed planted nearby is planted an inch deep, the farmer using my planter will be certain in all cases of obtaining a good stand no matter what the weather conditions may happen to be.

Additional objects of the invention will appear in the following complete specification, in which the preferred form of my invention is disclosed.

Figure 2:
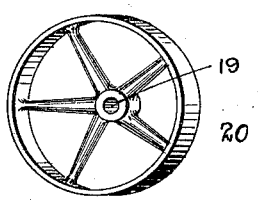
Figure 3:
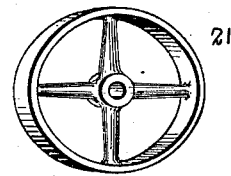

In the drawings similar characters of reference indicate corresponding parts in all the views in which:

Figure 1 is a perspective view showing my improved planter; and Figs. 2 and 3 are perspective views showing modified forms of the press wheel.

By referring to the drawings it will be seen that an open frame 5 is provided having depending portions 6, with bearings 7, in which the stud or axle 8 is journaled, to which is secured the wheel 9. The frame 5 is provided with the usual clevis 10. Extending rearwardly from the open frame 5 there are handle bars 11, which are connected by a strut 12. Secured to and depending from the open frame 5 at the rear of the wheel 9 there is a runner or furrow opener 13, which is adapted to open a little furrow in which the seed is planted. Behind the runner 13 there is a seed spout 22, which is secured to the open frame 5, and is connected with the hopper 15, mounted on the open frame 5.

The shovels or covers 14 are secured to the open frame 5 and are disposed behind the seed spout 22. This construction resembles very closely the construction of planters now in use.

Where my planter differs from planters hitherto known is that my press wheel is in the form of an eccentric cam. This eccentric press wheel 16 is mounted on a shaft 17, journaled in bearings in arms 18, secured to the open frame 5. In the form shown in Fig. 1 of the drawings, surfaces of the periphery of the press wheel are flattened, while in the construction shown in Fig. 3 of the drawings, the press wheel is oval in shape. In the form shown in Fig. 2 of the drawings, the press wheel is round, but the bearing 19 is at one side of its center.

When the planter is used the amount of dirt with which the seed is covered varies, and the amount of dirt between certain of the seed and the air and sunlight is much greater than is the case with some of the other seed, which has been planted in the same furrow. In other words the distance between the seed and the air and sunlight at the top of the covering dirt varies. When the seed is planted in this manner, under certain atmospheric conditions seed planted at certain distances from the sunlight and air at the top of the dirt which covers the seed will germinate, while under different atmospheric conditions seed planted at greater distances below the top of the dirt which covers the seed, will germinate more quickly.

The press wheel 16 shown in Fig. 1 of the drawings may be used, or, if desired, the press wheel 20, shown in Fig. 2 of the drawings, or the press wheel 21, shown in Fig. 3 of the drawings may be employed. Irrespective of the form of the cam or eccentric press wheel which is employed, the press wheel will, in each case, as it rotates, raise and lower the shaft 17, and as this shaft 17 is journaled in bearings in the arms 18, the arms 18, and with them the rear of the open frame 5, will be raised and lowered during the movement of the planter along the ground. Inasmuch as the runner or ground opener 13 is secured to the open frame, it will be raised and lowered with the frame while in the ground, and while the planter is moving along the ground, so that it will open the ground at varying depths, and the seed may be planted, so that when it is covered by the ground coverers 14, some of the seed will be disposed at a greater distance from the air and sunlight at the top of the ground, than is the case with other seed which has been planted.

Having thus described my invention I claim as new and desire to secure by Letters Patent:

1. A planter provided with a furrow opener, means for raising and lowering the said opener while in the ground to form a furrow of irregular depth, means for feeding seed to the said furrow, and means for covering the seed.

2. In a planter a frame having a bearing, a wheel mounted to rotate in the bearing, a furrow opener secured in the frame for opening a furrow, a seed spout mounted on the frame and disposed behind the furrow opener, additional bearings in the frame in the rear of the seed spout, and an eccentric press wheel journaled in the last-mentioned bearings for traveling on the ground, over the furrow and adapted for reciprocating the rear of the frame vertically as the planter is operated.

3. A planter provided with a furrow opener, a cam member, means connecting the cam member with the opener for raising and lowering the said opener while in the ground to form a furrow of irregular depth, a seed spout for depositing seed in the furrow, and means for covering the seed.

4. A planter provided with a frame, a furrow opener carried by the frame, an eccentric member mounted on the frame at the rear of the furrow opener, and disposed for traveling on the ground, for raising and lowering the said opener while in the ground to form a furrow of irregular depth, and means for feeding seed to said furrow.

5. A planter provided with a furrow opener, supporting means for said planter adapted to automatically raise and lower the opener while in the ground to form a furrow of irregular depth, means for feeding seed to the said furrow, and a seed coverer, disposed in the rear of the planter for covering the seed.

6. A planter provided with a furrow opener, automatic reciprocating means for raising and lowering the opener while in the ground to form a furrow of irregular depth, means for depositing seed in the furrow, and a seed coverer disposed for traveling on the surface of the ground for covering the seed.

In testimony whereof I have signed my name to this specification in the presence of two subscribing witnesses.

RALPH ALLEN.

Witnesses:
A. J. MARTIN,
A. E. COLLINS.

Copies of this patent may be obtained for five cents each, by addressing the "Commissioner of Patents, Washington, D. C."